United States Patent [19]

Thayer, III

[11] Patent Number: 5,392,988

[45] Date of Patent: Feb. 28, 1995

[54] UNIFORM DROPLET GENERATOR

[75] Inventor: William J. Thayer, III, Kent, Wash.

[73] Assignee: The United States of America as represented by the Secretary of the Air Force, Washington, D.C.

[21] Appl. No.: 186,055

[22] Filed: Jan. 19, 1994

[51] Int. Cl.⁶ .................................................. B05B 1/02
[52] U.S. Cl. ............................ 239/102.2; 261/DIG. 48
[58] Field of Search ......................... 239/102.2, 102.1; 222/420; 261/81, DIG. 48

[56] References Cited

U.S. PATENT DOCUMENTS

| | | | |
|---|---|---|---|
| 3,731,850 | 5/1973 | Weitzel et al. | 222/193 |
| 3,983,740 | 10/1976 | Danel | 73/12 |
| 4,070,424 | 1/1978 | Olson et al. | 261/DIG. 48 X |
| 4,076,617 | 2/1978 | Bybel et al. | 261/DIG. 48 X |
| 4,080,700 | 3/1978 | Muller | 29/157 C |
| 4,658,269 | 4/1987 | Rezanka | 346/75 |
| 4,819,831 | 4/1989 | Green et al. | 222/420 |
| 4,871,489 | 10/1989 | Ketcham | 264/9 |
| 4,929,400 | 5/1990 | Rembaum et al. | 264/10 |
| 5,024,695 | 6/1991 | Ashdown et al. | 75/338 |
| 5,171,360 | 12/1992 | Orme et al. | 75/331 |
| 5,227,239 | 7/1993 | Upadhye et al. | 428/402 |

FOREIGN PATENT DOCUMENTS

| | | | |
|---|---|---|---|
| 2841385 | 3/1980 | Germany | 239/102.2 |
| 259591 | 10/1990 | Japan | 239/102.1 |
| 1576052 | 7/1990 | U.S.S.R. | 239/102.1 |

*Primary Examiner*—Andres Kashnikow
*Assistant Examiner*—Lesley D. Morris
*Attorney, Agent, or Firm*—Stanton E. Collier; Jacob N. Erlich

[57] ABSTRACT

The uniform droplet injector assembly is a rigid, low mass injector having a plurality of nozzles therein attached to a manifold. The manifold vibrates by piezoelectric actuators and springs in combination. The droplet injector array allows the process stream to flow through the injector assembly with the droplets uni7 formly dispersed into this stream. The moving parts such as the injector assembly, springs, and actuators are structurally resonant at a frequency near the droplet formation frequency. The colinear, spring/actuator configuration minimizes internal stresses due to manufacturing tolerances, preloading requirements, temperature changes, and cyclic operation in a large area generator. The linear spring/actuator configuration has low stiffness in the vibration direction and high stiffness in transverse direction to eliminate motions which would cause nonuniformly sized droplets.

5 Claims, 6 Drawing Sheets

UNIFORM DROPLET GENERATOR

STATEMENT OF GOVERNMENT INTEREST

The invention described herein may be manufactured and used by or for the Government for governmental purposes without the payment of any royalty thereon.

BACKGROUND OF THE INVENTION

The present invention relates to gas lasers, and, in particular, relates to generators of excited state gases by injectors which supply reactants to the gas lasers, and, in greater particularity, relates to chemical oxygen-iodine lasers (COIL).

Many devices are available to produce a single droplet stream such as shown in U.S. Pat. Nos. 4,819,831; 3,731,850; and 3,983,740. The placement of these devices in a flow channel of a gas laser is not practical.

Atomizer devices produce a spray of particles from a single nozzle. A liquid under pressure is pushed through a nozzle having a plurality of holes in it. A plurality of streams are formed and because of instability each stream breaks into droplets. Although this device produces many droplets, the mixing of these droplets with a gas stream produces non-uniform mixing. An example of an atomizer nozzle is that shown in U.S. Pat. No. 4,080,700.

Another method of producing droplets is by double fluid atomization. In this method, the liquid is forced from a jet nozzle to form a thin liquid stream which is contacted by a second stream of high pressure gas resulting in a highly turbulent mixing and break up of the liquid stream into droplets. One disadvantage of this method is that the liquid droplets produced are non-uniform in size.

Another method of producing droplets is by the vibrating orifice method. In this process, a plate with a plurality of orifices of preselected size has a pressurized liquid fed therethrough. A uniform spray of droplets can be generated by this device. The mixing of these droplets with a reactant flow to produce a uniform mixture is difficult.

SUMMARY OF THE INVENTION

The present invention is a generator for supplying oxygen in the singlet delta state, $O_2(^1)$ to a chemical oxygen-iodine laser (COIL). This generator reacted multiple streams of uniformly sized droplets of basic hydrogen peroxide (BHP) solutions with chlorine gas to produce the excited oxygen.

The uniform droplet generator is a rigid, low mass injector having a plurality of nozzles therein attached to a rigid support base by means for vibrating the injector being composed of actuators and springs. The droplet injector nozzle array allows the process stream to flow through the injector with the droplets uniformly dispersed into this stream. The moving parts such as the injector, springs, and actuators are structurally resonant at a frequency near the droplet formation frequency. The colinear, spring/actuator configuration minimizes internal stresses due to manufacturing tolerances, preloading requirements, temperature changes, and cyclic operation in a large area injector. The linear spring/actuator configuration has low stiffness in the vibration direction and high stiffness in the transverse direction to eliminate motions which would cause non-uniformly sized droplets.

Therefore, one object of the present invention is to provide a uniform droplet generator.

Another object of the present invention is to provide a droplet generator for use in a gas laser system.

Another object of the present invention is to provide a droplet generator able to output over a large area.

Another object of the present invention is to provide a droplet generator that operates at high frequency without undue power requirements.

Another object of the present invention is to provide a droplet generator that is able to accommodate thermal changes without undergoing excessive mechanical stresses.

Another object of the present invention is to provide a droplet generator which generates a multitude of streams of closely spaced, uniform spacing, uniform velocity, uniformly sized liquid droplets within a flowing process stream.

These and many other objects and advantages of the present invention will be readily apparent to one skilled in the pertinent art from the following detailed description of a preferred embodiment of the invention and the related drawings.

DETAILED DESCRIPTION OF THE INVENTION

Figure 1:
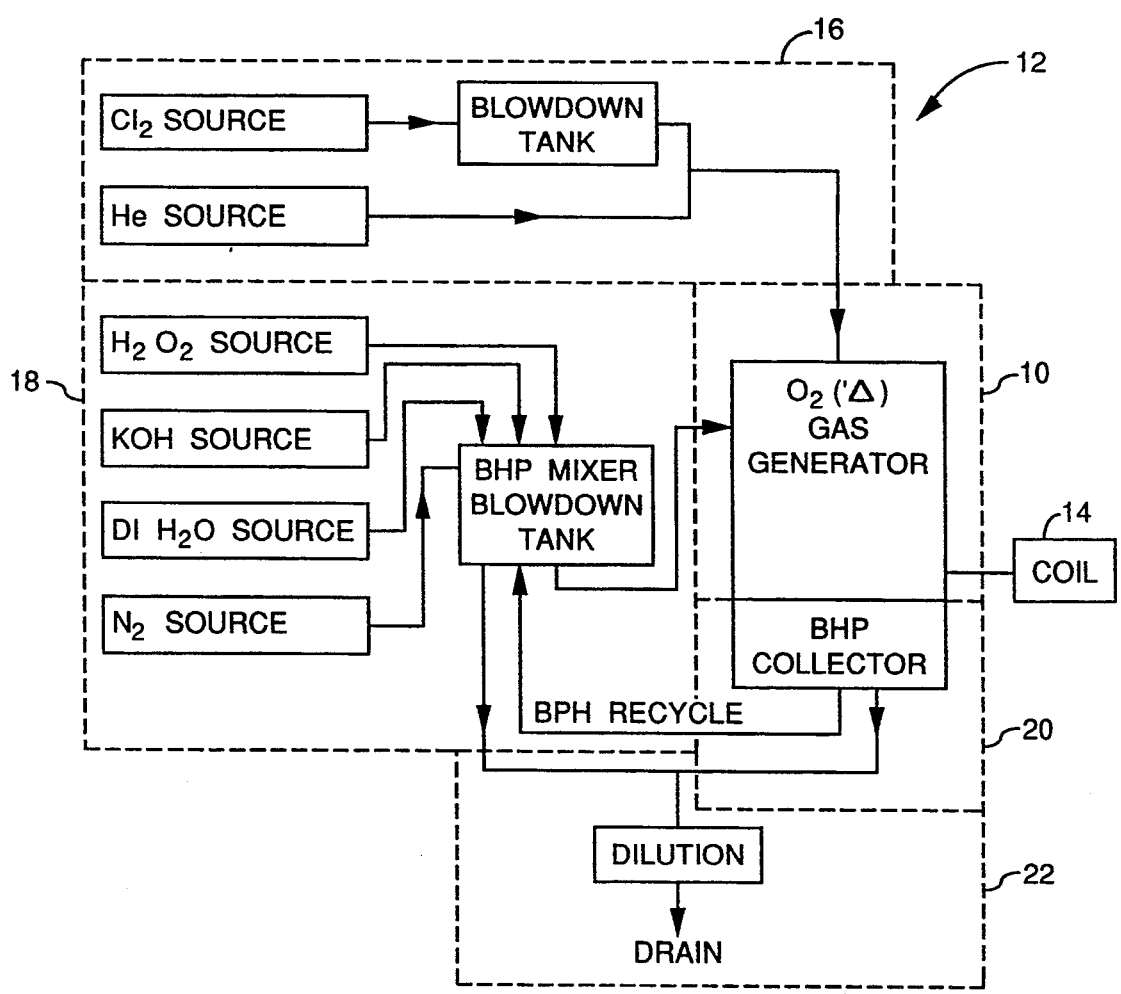
FIG. 1 illustrates by schematic the present invention in a laser system.

Referring to FIG. 1, a uniform droplet $O_2(^1)$ generator 10 is shown schematically in a laser system 12 for producing excited oxygen for a COIL laser 14. A gas supply 16 provided a mixture of chlorine and helium to the gas generator 10. A source of basic hydrogen peroxide (BHP) 18 provides BHP to the generator 10 for reaction with the chlorine/helium gas. Partially reacted BHP was collected in the BHP collector 20 and returned to the BHP supply 18. When the BHP solution was no longer needed, it was disposed of by a dilution removal device 22 from the BHP supply 18 and the BHP collector 20. Other components of the system as not detailed as these are considered conventional items such as valves, chillers, etc.

Figure 2:
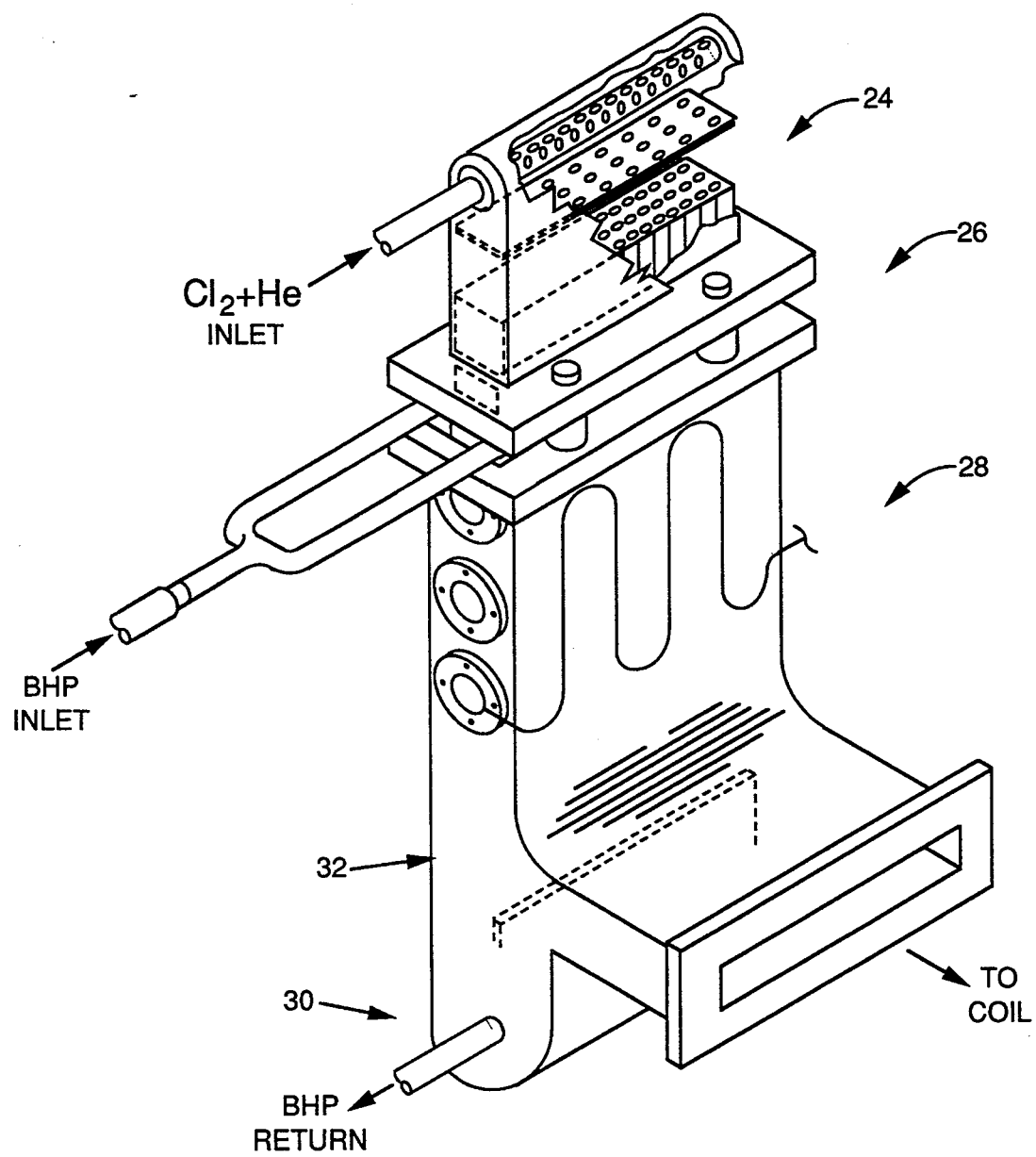
FIG. 2 illustrates by perspective the present invention is a partial view of the laser system.
Figure 3:
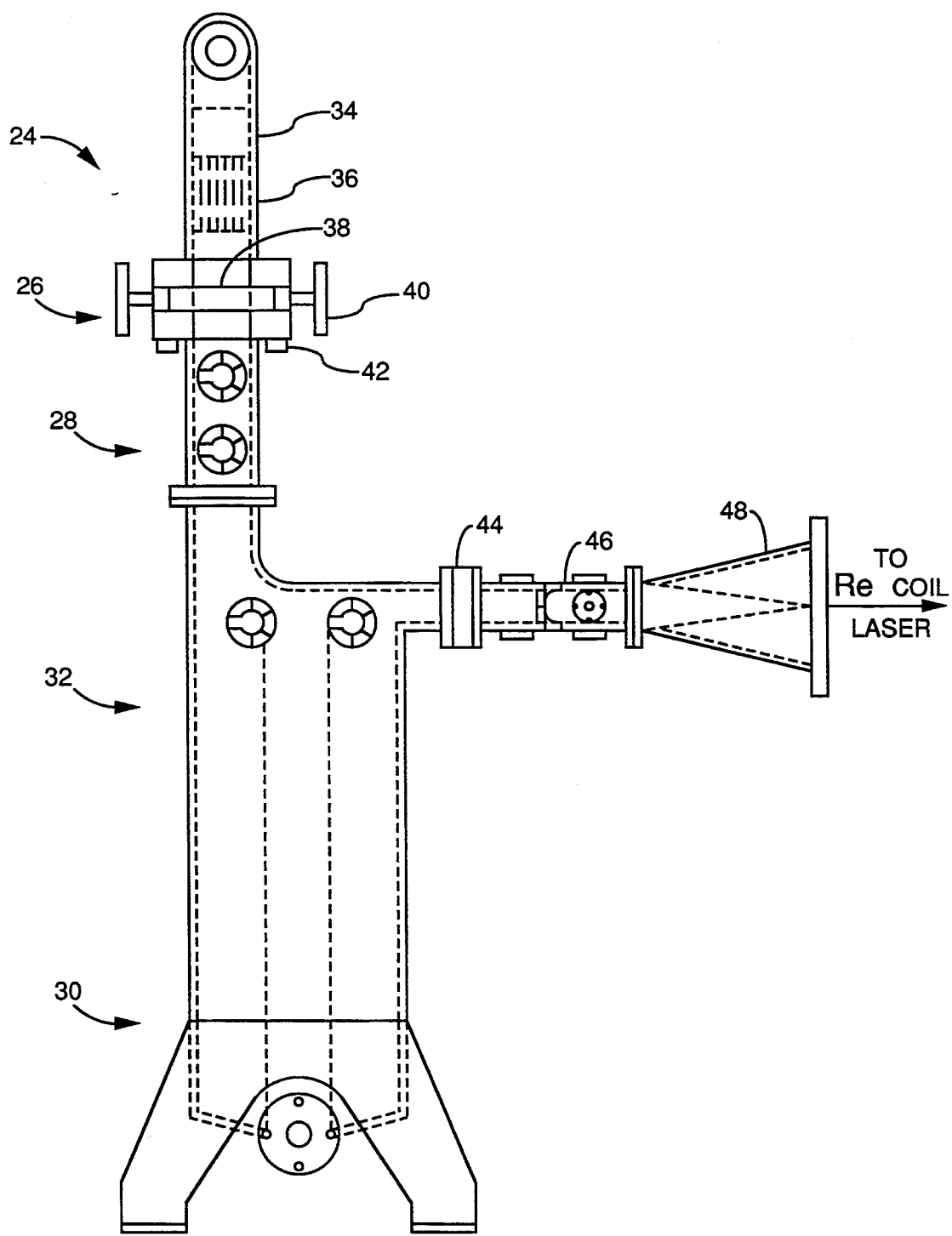
FIG. 3 illustrates by side view the oxygen droplet generator of the present invention.

A view of the generator 10 is shown in FIG. 2. As seen therein the chlorine-diluent stream enters a flow distributor and straightener 24 and then passes into a droplet injector array 26. The BHP stream enters the droplet injector array 26 where the BHP is made into uniform sized droplets and distributed uniformly over the reactor flow cross-section. The mixed BHP and chlorine react in a oxygen generator reaction section 28 after which the liquid droplets and gas are separated by a separator 32 after which a liquid collector 30 returns the BHP to the BHP supply 18. FIG. 3 further includes flow distributor plates 34, flow straighteners 36, a BHP injector assembly 38, BHP flow inlets 40, piezoelectric drivers 42, a thermal isolator 44, a diagnostic section 46, and a transition duct 48.

Figure 4:
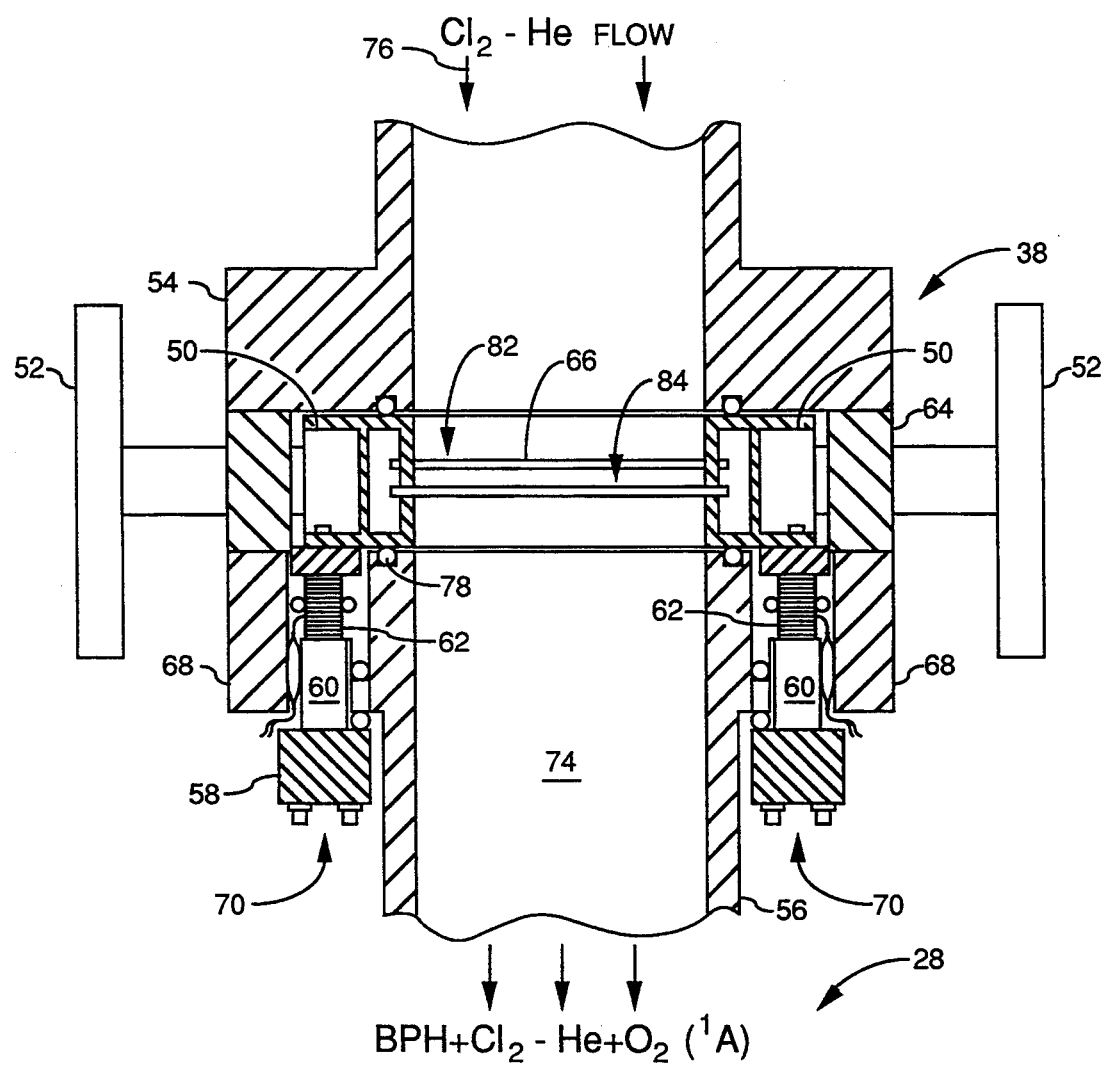
FIG. 4 illustrates by end view cross section the present invention within a excited state gas supply flow channel of a gas laser.
Figure 5:
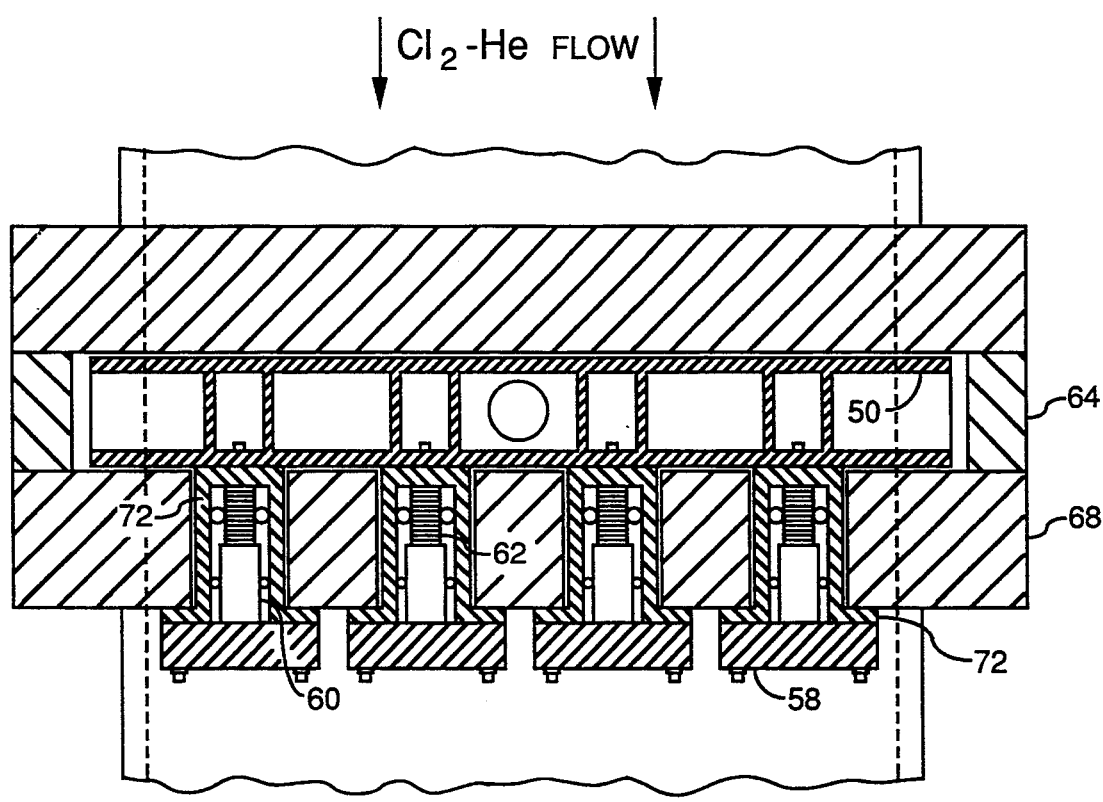
FIG. 5 illustrates by side view cross section the droplet generator mounted to the flow channel.

As seen in FIG. 4, a fluid such as BHP, not shown, is input into an injector manifold 50 of the injector assembly 38 through inlets 52. The injector assembly 38 is mounted between a bottom flange 54 of the chlorine/-helium inlet manifold and a top flange 56 of the reactor section 28 with a spacer 64 as shown in FIGS. 4 and 5. Attached to the manifold 50 and a mounting flange 68 are a plurality of vibrating means 70. Each vibrating means 70 has a spring 72, FIG. 5, inside the spring 72 is a piezoelectric actuator 62 and an actuator spacer 60. The spacer 60 with the spring 72 attached thereon is further attached to a base retainer 58. The vibrating motion of the actuator 62 is transmitted to the manifold 50 through the spring 72.

Referring to FIG. 4, the injector assembly 38 is shown mounted in a flow channel 74 having the flow stream 76 flowing past and perpendicular to an injector assembly 38 having a plurality of injector tubes 66. The injector tubes 66 are connected between the supply manifolds 50. To prevent the loss of fluid, seals 78 are placed between the manifolds 50 and the mounting flanges 54 and 56. As seen in FIG. 5, the vibrating means 70 are mounted on manifold 50.

Figure 6:
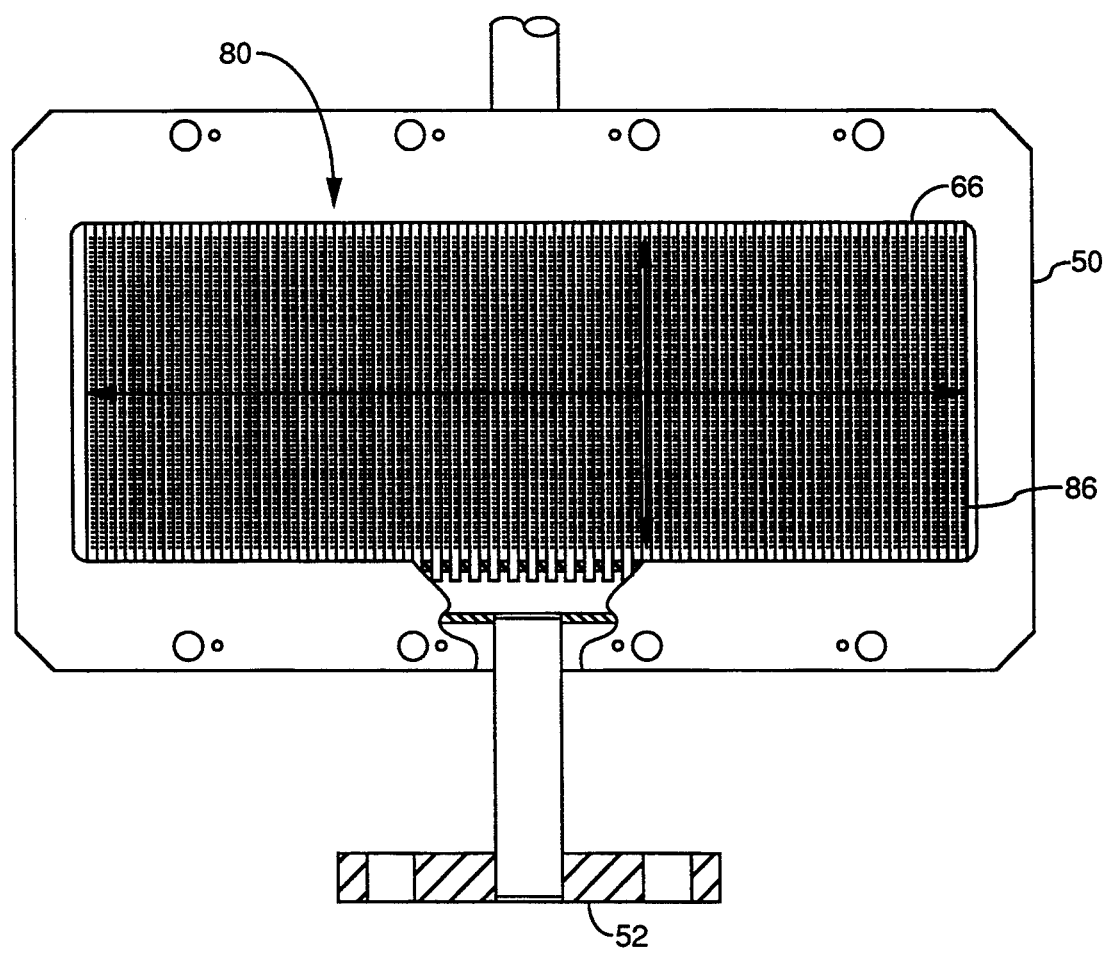
FIG. 6 illustrates by bottom view the droplet generator of the present invention.

FIG. 6 illustrates the injector array 80 being of rectangular design and having a plurality of injector tubes 66 running parallel from the manifold 50. Other shapes are clearly feasible but would require more manufacturing time to make the manifolds. As seen in FIGS. 4 and 6, the injector tubes 66 consist of two groups: an upstream group 82 and a downstream group 84 wherein the injector tubes 66 as seen from above alternate to present a "solid" array of injector tubes 66 as seen in FIG. 6. Each injector tube 66 has a plurality of nozzles 86 thereon selected according to the fluid to be output. A multitude of liquid streams, not shown, flow out of the nozzles 86 in the direction perpendicular to the injector tubes 66. Very precise vibration of the injector array 80 causes these liquid streams to form streams of uniformly sized droplets. Another fluid stream flows around and between the tubes shown in FIG. 4 in a direction parallel to the uniform droplet streams. The manifold 50 is supported on stiff springs 72 in which the piezoelectric actuators 62 are mounted colinearly within the springs 72. The combined spring stiffness is high enough that the injector body is mechanically resonant at a vibration frequency near the maximum excitation frequency. This minimizes the power required to drive the injector vibration. Each injector fluid manifold is supported and driven by multiple vibrating means 70 with the number, spacing, and location chosen so that the manifold structural elements do not bend and vibrate at frequencies other than the excitation frequency. The spring/actuators are matched and driven in parallel to induce a simultaneous displacement to all parts of the injector assembly 38. This minimizes the required structural cross section to prevent bending and minimizes the mass of the moving injector body. This minimizes actuator power requirements and forces on springs and actuators. Rectangular springs 72, for example, are long relative to their cross section so that the lateral stiffness is low relative to the stiffness in the vibration direction. This allows the springs to bend elastically during temperature and pressure changes from the assembly conditions to the operating temperature and between operating conditions. This configuration also allows the springs to operate with bending stress below the elastic limit, provides good fatigue life, and allows the size of the injector to be usually large. The low lateral stiffness relative to the stiffness along the vibrational axis causes any undesired vibrational motion in these directions to be very low relative to the excitation for making uniform droplets, and thus be in a frequency range that does not influence droplet generation. The colinear actuator and spring configuration minimizes the force and stress on the actuator caused by length variations caused by manufacturing tolerances, preloading of the actuators during assembly, temperature changes, and cyclic operation by allowing the required strain to be shared by the stretching of the spring and the compression of the actuator. This greatly reduces fluctuating stresses on the actuators which must operate near their stress limits. This minimizes the precision with which the components have to be manufactured to prevent the loading of the actuators from being too high or low. The injector is sealed between the support structure flanges using soft elastomer material which allows the injector to vibrate, expand due to operating condition changes without inducing mechanical difficulties.

This generator 10 has a high mass flow rate of uniformly sized droplets over a large cross sectional flow area. A multitude of nozzles are used to distribute liquid streams into a process stream which flows through the injector head. All of the liquid injector nozzles are vibrated at a single, fixed frequency to cause disturbances in each of the liquid jets which will cause each liquid jet to break into uniform diameter droplets, and can be driven at a uniform, high vibration frequency where the vibration frequency is fixed by liquid jet size, droplet size, velocity, etc. Table 1 provides characteristics for the generator 10 of a baseline design.

TABLE 1

| UNIFORM DROPLET OXYGEN GENERATOR BASELINE DESIGN (0.1 M/s) | | |
|---|---|---|
| Oxygen Generator Baseline Design: | | Range |
| $Cl_2$ Flowrate | 0.1 mole/s | 0.05–0.15 |
| $He/Cl_2$ | 5/1 | 3/1–5/1 |
| Pressure | 50 torr | 20–100 torr |
| BHp Molarity | 7 M (50% $H_2O_2$) | 7 M–10 M |
| Droplet Size | 500 μm | 450–660 μm |
| Gas Velocity | 10 m/s | 4.0–12.0 m/s |
| Droplet Velocity | 5 m/s | 4.0–10.0 m/s |
| BHP Flowrate | 1.2 kg/s | 1.0–3.0 kg/s |
| Number of Orifices | 3950 | |
| Dimensions | 25.9 cm (L) × 9.9 cm (W) × 56.4 cm (H) | |
| Reactor Length | 51.08 cm (20.11") | |

Table 2 provides information as to the injector assembly 38 and the injector array 80.

TABLE 2

| UNIFORM DROPLET INJECTOR PARAMETERS | | |
|---|---|---|
| Injector Orifice Diameter | $d_o$ | 288 μm |
| Injector Vibration Frequency | f | 5000 Hz |
| Vibration Direction | x | Flow Axis |
| BHP Injection Velocity | $U_o$ | 500 cm/s |
| Injection Velocity Uniformity | $\Delta U_o$ | ±4% |
| BHP Surface Tension | $\sigma_{BHP}$ | 70 dyne/cm |
| BHP Jet Reynolds Number | $Re_j$ | 56 |
| BHP Jet Weber Number | $We_j$ | 139 |
| BHP Droplet Diameter | $D_d$ | 500 μm |
| Number of BHP Manifolds | | 2 |
| Number of Injector Tubes | | 79 |
| Number of Orificies Per Tube | | 80 |
| Number of Injector Orificies | | 3950 |
| Injector Tube Natural Frequency | | |

TABLE 2-continued

| UNIFORM DROPLET INJECTOR PARAMETERS | |
| --- | --- |
| 1st Transverse Mode | 710 Hz |
| 3rd Transverse Mode | 6400 Hz |
| 5th Transverse Mode | 17.7 kHz |

Liquid jet instability causes liquid jets to break up into streams of droplets with a diameter range that varies from 0.001 to many times the injector nozzle diameter. Within a narrow liquid velocity range, vibration of the liquid nozzle or injector orifice can cause the liquid jets to break up into uniformly sized droplets with a diameter approximately two to four times the orifice diameter. Higher velocities cause the liquid jets to break up into a wide range of small droplet sizes, while lower velocities result in no jet formation, wetting of the injector body, coalescence of the streams from multiple jets and the formation of large liquid streams or, periodically, drops that are many times the diameter of the injector orifice. Within the uniform drop velocity range, a small range of vibration frequencies and amplitudes can cause the liquid jets to break up into uniformly sized droplets. Higher and lower vibration frequencies or amplitudes cause nonuniformly sized drops to form. If the injector vibrates at more than one frequency, droplets will form due to many of the frequencies and combination of frequencies. Therefore, it is desired that the injector vibrate at one frequency which is determined by the type of liquid and a combination of the fluid properties, injector orifice geometry, and flow conditions, including the liquid velocity and temperature.

The droplet formation frequency is in the range of a few hundred cycles per second up to ten thousand Hz for droplet sizes of 0.1 to 1.0 mm and liquid velocities from 500 to 20,000 cm/sec, which are of use for process applications. In this frequency range, the interior structure must be quite rigid to prevent multiple vibration modes. In the frequency range above approximately 1.0 kHz, piezoelectric devices are probably the best electrically driven motion generators. However, these devices must be mechanically preloaded so that they are in compression throughout their operating cycle, but not excessively preloaded or they will loose their piezoelectric properties.

Clearly, many modifications and variations of the present invention are possible in light of the above teachings and it is therefore understood, that within the inventive scope of the inventive concept, the invention may be practiced otherwise than specifically claimed.

What is claimed is:
1. A droplet injector assembly, said droplet injector assembly comprising:
   an injector array, said injector array comprising:
      a plurality of injector tubes, said injector tubes being parallel to one another, said injector tubes having a plurality of nozzles therein for outputting streams of droplets of a fluid, said nozzles being in a single row in each tube, said plurality of injector tubes being located in an upstream group and a downstream group, said injector tubes in said groups alternating in position so as to present a uniform array to a process stream flowing thereby;
   a supply manifold, said supply manifold receiving said fluid from a fluid source external to said droplet assembly, said injector tubes connected into said supply manifold;
   means for vibrating, said means for vibrating connected to said injector array, said vibrating means causing said streams of said fluid to break into streams of droplets of a predetermined size; and
   means for mounting, said means for mounting connected to said means for vibrating and said injector array, said means for mounting being connected into a flow channel having therein a process stream that flows through said injector assembly.

2. A droplet injector assembly as defined in claim 1 wherein said means for vibrating comprises:
   a base retainer, said base retainer connected to said means for mounting;
   a spring, said spring connected to said base retainer and said fluid manifold;
   an actuator, said actuator operably connected to said manifold;
   a spacer, said spacer mounted between said actuator and said base retainer; and
   a support, said support connected to said base retainer and said spring, said actuator causing said manifold to vibrate and said manifold causing said injector array to vibrate, said vibration being of a preselected frequency to cause said streams of fluid to break into droplets.

3. A droplet injector assembly as defined in claim 2 wherein said actuator is a piezoelectric actuator.

4. A droplet injector assembly as defined in claim 2 wherein said spring has a rectangular cross section.

5. A droplet injector assembly as defined in claim 1 wherein said injector assembly is flexibly sealed within a flow channel to allow the vibration of said injector assembly.

* * * * *